(12) United States Patent
Naething et al.

(10) Patent No.: US 10,267,895 B1
(45) Date of Patent: Apr. 23, 2019

(54) DOPPLER-ASSISTED SENSOR FUSION

(71) Applicant: National Technology & Engineering Solutions of Sandia, LLC, Albuquerque, NM (US)

(72) Inventors: Richard M. Naething, Albuquerque, NM (US); Richard C. Ormesher, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 687 days.

(21) Appl. No.: 14/927,138

(22) Filed: Oct. 29, 2015

Related U.S. Application Data

(60) Provisional application No. 62/131,762, filed on Mar. 11, 2015.

(51) Int. Cl.
  *G01S 5/02* (2010.01)
  *G01S 5/04* (2006.01)
  *G01S 3/46* (2006.01)
  *G01S 3/52* (2006.01)

(52) U.S. Cl.
  CPC ............. *G01S 5/04* (2013.01); *G01S 5/0268* (2013.01); *G01S 3/46* (2013.01); *G01S 3/52* (2013.01)

(58) Field of Classification Search
  CPC . G01S 3/46; G01S 3/52; G01S 5/0264; G01S 5/0268; G01S 5/04
  USPC ........................................ 342/417, 418, 451
  See application file for complete search history.

(56) References Cited

U.S. PATENT DOCUMENTS

| | | | |
|---|---|---|---|
| 5,821,895 A | 10/1998 | Hounam et al. | |
| 6,577,266 B1 | 6/2003 | Axline | |
| 6,577,272 B1* | 6/2003 | Madden | G01S 3/50 342/387 |
| 6,806,828 B1* | 10/2004 | Sparrow | G01S 11/10 342/127 |
| 7,893,875 B1* | 2/2011 | Smith | G01S 11/10 342/464 |
| 8,009,772 B1 | 8/2011 | Ormesher et al. | |
| 8,134,493 B2* | 3/2012 | Noble | G01S 5/04 342/107 |
| 8,294,616 B1 | 10/2012 | Ormesher et al. | |
| 8,405,539 B2 | 3/2013 | Saitto et al. | |
| 8,471,766 B2* | 6/2013 | Parker | G01S 5/16 342/378 |
| 8,730,092 B2* | 5/2014 | Jaffer | G01S 13/003 342/159 |
| 8,912,943 B2 | 12/2014 | Apostolos et al. | |
| 9,007,262 B1* | 4/2015 | Witzgall | G01S 5/10 342/357.78 |
| 9,651,648 B1* | 5/2017 | Mason | G01S 5/0263 |
| 9,661,604 B1* | 5/2017 | O'Shea | H04W 64/00 |
| 9,891,306 B2* | 2/2018 | Wellman | G01S 5/0221 |

(Continued)

*Primary Examiner* — Chuong P Nguyen
(74) *Attorney, Agent, or Firm* — Medley, Behrens & Lewis, LLC

(57) ABSTRACT

Various technologies for identifying RF emitters in geolocation datasets are described herein. Doppler signatures of RF emitters and geolocation data of objects in a scene are collected simultaneously, then range-rate profiles of the movement of the RF emitters and the objects in the scene are computed. An RF emitter is identified in a geolocation dataset by comparing the motion of the RF emitter with the motion of an object in the scene as described by the respective range-rate profiles.

17 Claims, 8 Drawing Sheets

(56) References Cited

U.S. PATENT DOCUMENTS

| | | | |
|---|---|---|---|
| 2004/0027276 A1* | 2/2004 | Herman | G01S 5/06 342/181 |
| 2010/0315290 A1* | 12/2010 | Grabbe | G01S 5/0205 342/386 |
| 2011/0273328 A1* | 11/2011 | Parker | G01S 5/06 342/357.26 |
| 2018/0203094 A1* | 7/2018 | Gudim | G01S 5/04 |

* cited by examiner

DOPPLER-ASSISTED SENSOR FUSION

RELATED APPLICATION

This application claims priority to U.S. Provisional Patent Application No. 62/131,762, filed on Mar. 11, 2015, and entitled "Doppler-Assisted Sensor Fusion", the entirety of which is incorporated herein by reference.

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Aerial and other wide-area surveillance technologies now permit persistent, real-time observation of large scenes coupled with the ability to accurately determine the location of objects present in the scenes. Geolocation data, which can be images and other data about the location of objects in a scene, can be generated by geolocation sensors, such as GMTI or other radar, optical sensors, etc. In a given geolocation dataset, however, it maybe unclear whether a particular observed object is an object of interest, or whether it is some other object that merely has similar characteristics in the geolocation dataset. Radio frequency (RF) sensors and emitters are used to identify a particular object of interest within a geolocation dataset. Associating the identification of an object of interest using RF sensors with geolocation data that accurately describes the position of the object has been accomplished by comparing movement information generated by RF sensor data with positions of objects identified in the geolocation data. Position solutions or lines of bearing from RF sensors used in this process are generated using frequency difference of arrival (FDOA) or angle of arrival (AOA) methods that require long collection times or large baseline, multi-phase antennas. When the object of interest is moving, the position fix generated by these methods has significantly reduced accuracy or requires significant latency (e.g., several minutes) to acquire.

SUMMARY

The following is a brief summary of subject matter that is described in greater detail herein. This summary is not intended to be limiting as to the scope of the claims.

Various technologies for associating geolocation data with object identity information from RF sensors are described herein. In an example, a sensor association system is configured to receive: 1) location data of objects in a scene observed by a geolocation sensor; and 2) Doppler signatures of RF emitters in the scene observed by an RF sensor, and to use this data to identify which location data corresponds with an RF emitter of interest in the scene. The sensor association system, for example, can generate an RF range-rate profile of the RF emitter from a Doppler signature corresponding to the scene. Additionally, the sensor association system can generate a geolocation range-rate profile of an object in the scene from geolocation data of the scene. The sensor association system can then compare the RF range-rate profile with the geolocation range-rate profile to determine whether the respective range-rate profiles describe similar movement. For instance, a value that is indicative of a similarity between the RF range-rate profile and the geolocation range-rate profile can be computed, and the value can be compared with a threshold. When the RF range-rate profile and the geolocation range-rate profile are found to be sufficiently similar (e.g., the value is beneath the threshold), then it can be inferred that RF emitter is the object in the scene (from the geolocation data) or is at the location of the object in the scene. Thus, where many objects can be observed by a geolocation sensor in a single scene, the sensor association system can determine which of these objects corresponds to which RF emitter.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
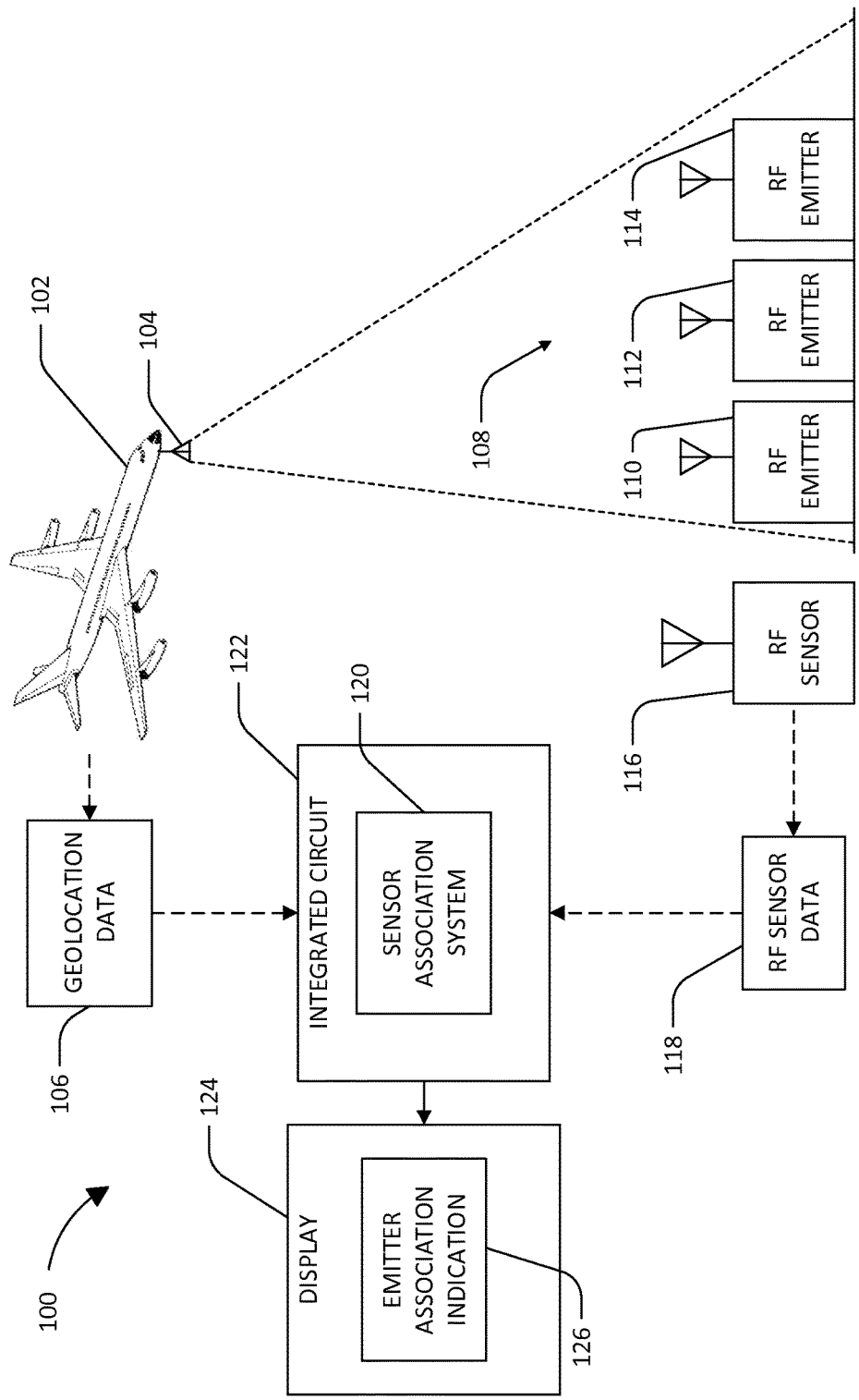
FIG. 1 is a functional block diagram of an exemplary system that facilitates the association of RF emitter identity information from an RF sensor with geolocation data collected by a geolocation sensor.

Various technologies pertaining to associating RF emitter identity information with geolocation data are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component," "module," and "system" are intended to encompass computer-readable data storage that is configured with computer-executable instructions that cause certain functionality to be performed when executed by a processor. The computer-executable instructions may include a routine, a function, or the like. It is also to be understood that a component, module or system may be localized on a single device or distributed across several devices. Additionally, as used herein, the term "exemplary" is intended to mean serving as an illustration or example of something, and is not intended to indicate a preference. Furthermore, as used herein, the terms "first," "second," etc., are intended only to serve as labels for certain specific objects and things, and are not intended to imply a sequential order, unless otherwise noted.

With reference to FIG. 1, an exemplary system 100 that facilitates associating an identity of RF emitters with position information from a geolocation sensor is illustrated. The system 100 includes a sensor platform 102, shown here as a plane, on which is mounted a geolocation sensor 104 that generates geolocation data 106 about several objects in a scene 108, shown here as RF emitters 110-114. An RF emitter can be any device or object capable of transmitting RF signals, including but not limited to a mobile communications device (e.g., a mobile telephone), a computing device, an automobile, etc. The system 100 also includes an RF sensor 116 that generates RF sensor data 118 about the RF emitters 110-114 in the scene 108. For example, the RF sensor 116 can generate data that is indicative of movement of the RF emitters 110-114 based upon RF signals emitted by the RF emitters 110-114. The system 100 further comprises an integrated circuit 122 that includes a sensor association system 120, where the sensor association system receives and processes data from the RF sensor 116 and the geolocation sensor 104 to associate an emitter's identity with its corresponding geolocation data. The system 100 also comprises a display 124, on which an emitter association indication 126 is shown.

In the exemplary system 100, the geolocation sensor 104 and the RF sensor 116 generate data about objects in the scene 108 simultaneously. The geolocation sensor 104 can be any sensor that provides positioning data 106 of objects in the scene. In an example, the geolocation sensor 104 can be a radar imaging system (e.g., synthetic aperture radar (SAR), ground moving target indicator (GMTI), etc.). In another example, the geolocation sensor 104 can be a high-resolution optical imaging system (e.g., full motion video (FMV), wide area motion imagery (WAMI), etc.). The geolocation sensor 104 applies standard techniques to determine a position for each object depicted in a set of observations of the scene 108 from sensor data gathered over a period of time (e.g., five seconds). These positions, taken together, comprise a "track" of the movement of objects in the scene over the period of time. The geolocation data 106 comprises these position data for each of the objects in the scene 108. The RF sensor 116 measures an RF signal frequency, or Doppler signature, of the moving RF emitters 110-114 in the observed scene 108 over the period of time. In the exemplary system 100, the RF sensor 116 need only measure the Doppler signature since it does not itself perform a geolocation operation to determine the position of objects in the scene, and thus it can be implemented with a single RF channel, thereby reducing the cost, size, weight, and power of the RF sensor 116 as compared with conventional systems using FDOA or AOA sensor pairing methods. Further, the RF sensor 116 is equipped with the capability to distinguish between the RF signatures of the RF emitters 110-114 in the scene.

Figure 2:
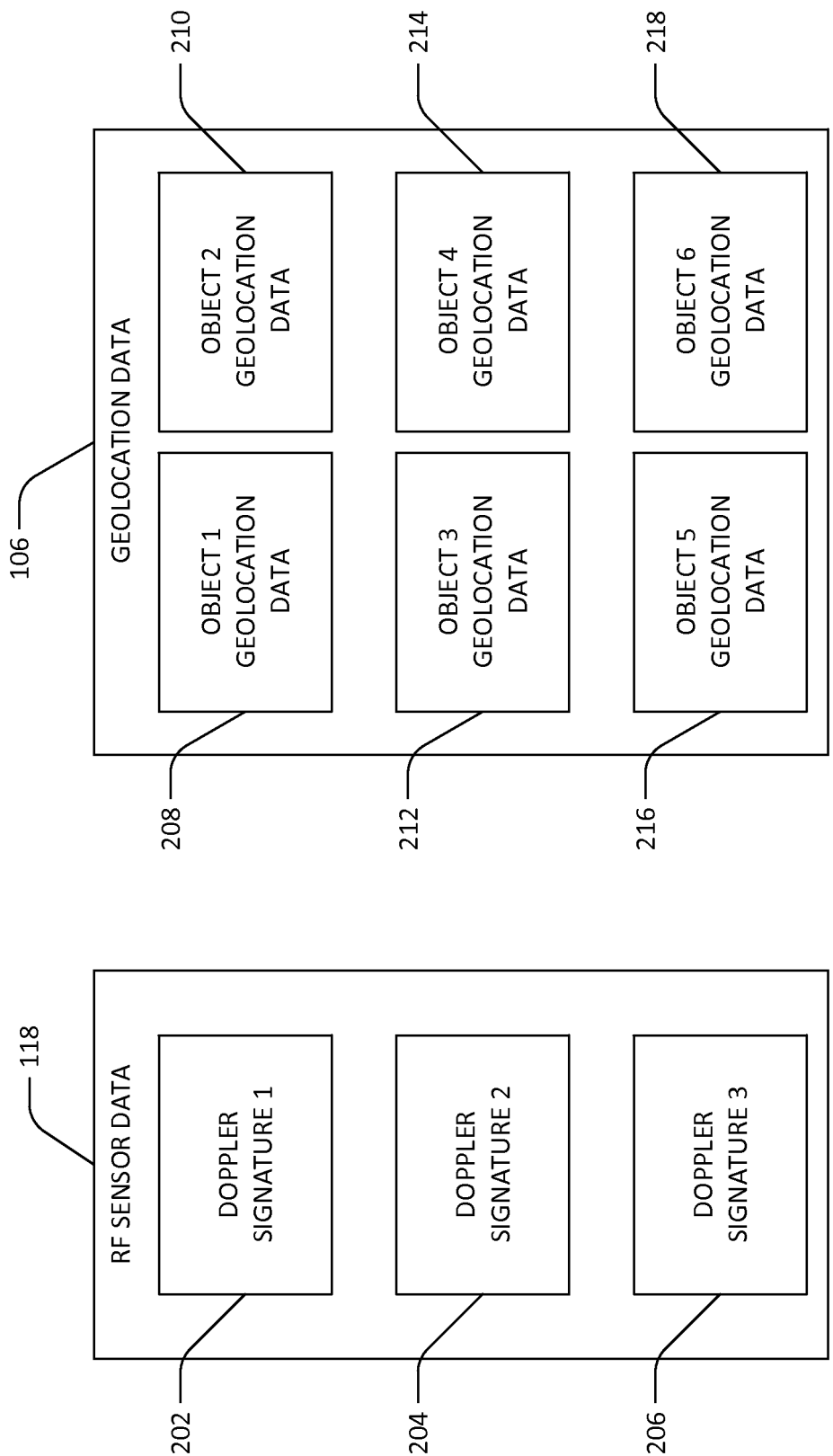
FIG. 2 is a diagram of an exemplary RF and geolocation data structure.

The geolocation data 106 and the RF sensor data 118 describe different aspects of two different, but potentially overlapping, sets of objects. Referring to FIG. 2, exemplary instantiations of the RF sensor data 118 and the geolocation data 106 are illustrated. In the illustrated example, the RF sensor data 118 comprises three Doppler signatures 202-206 of three different RF emitters in the scene 108 while the geolocation data 106 comprises position data 208-218 for six objects in the scene 108. In the scene 108, each of the RF emitters can be, or be attached to, one of the six objects for which there is position data 208-218. Thus, the position data 208-218 of the six objects also describes the position of the three RF emitters. Prior to performing a sensor association, however, it generally will not be known which RF emitter is described by which position data 208-218. The sensor association system 120 receives the geolocation data 106 and the RF sensor data 118, and identifies which emitter is associated with which position data.

Referring again to FIG. 1, the sensor association system 120 creates and analyzes range-rate profiles of RF emitters 110-114 and other objects in the scene 108 to determine which of the objects is which RF emitter. The sensor association system 120 is implemented with an integrated circuit 122 which, in an example, can be a field-programmable gate array (FPGA), a program-specific integrated circuit (ASIC), a computing device comprising a processor and memory, etc. The range-rate profiles computed by the sensor association system 120 describe the motion of objects in the scene 108 relative to the RF sensor 116. The sensor association system 120 can compute RF range-rate profiles of RF emitters 110-114 directly from the Doppler signatures in the RF sensor data 118, and can further compute geolocation range-rate profiles of objects observed by the geolocation sensor 104 based upon the geolocation data 106. The sensor association system 120 then compares the range-rate profiles computed from the RF sensor data 118 and the range-rate profiles computed from the geolocation data 106 to find RF range-rate and geolocation range-rate profile pairs that describe similar motion over the window of time. Based on this comparison, the sensor association system 120 can determine that first position data describes a first emitter. In an example, the scene 108 comprises dozens of objects each tracked in the geolocation data, and it is not known which of the objects observed is an RF emitter of interest. In the example, the system 100 can identify which of the objects is the emitter of interest rapidly, e.g., in seconds, by examining the range-rate profiles of the RF emitter and the various objects tracked in the geolocation data 106. The association of the RF emitter's identity with first geolocation data can then be presented on the display 124 as the emitter association indication 126.

Figure 3:
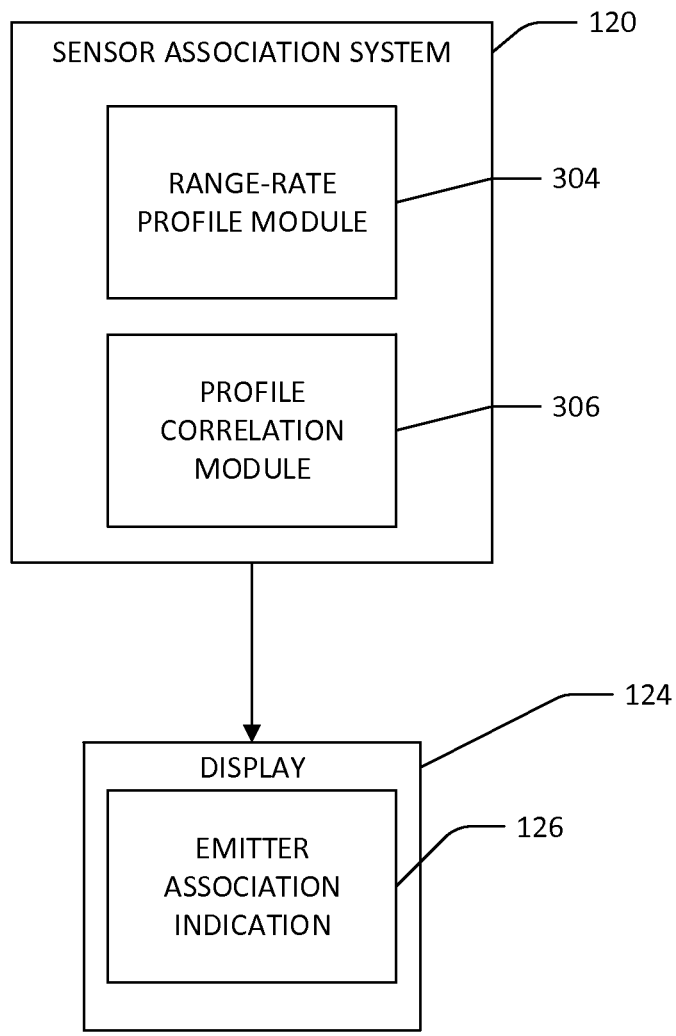
FIG. 3 is a functional block diagram of an exemplary system for processing and displaying emitter identification data.

Referring now to FIG. 3, an exemplary illustration of the sensor association system 120 and its output to the display 124 is shown. The sensor association system 120 comprises a range-rate profile module 304, and a profile correlation module 306. The sensor association system 120 takes advantage of information about the relative motion of an RF emitter that may be derived from RF sensor data 118 comprising a Doppler signature of the emitter to determine if the emitter's motion as described by the Doppler signature is comparable to the motion observed in geolocation data 106 of an object in the scene 108. The range-rate profile module 304 calculates a profile of range-rate versus time with respect to the RF sensor 116 for each of the RF emitters 110-114 detected in the scene by the RF sensor 116 and each object in the scene for which geolocation data 106 has been collected by the geolocation sensor 104. The profile correlation module 306 then compares the RF range-rate profiles of the RF emitters 110-114 and the geolocation range-rate profiles of the objects in the scene to find RF and geolocation range-rate pairs that describe similar motion. Based upon this comparison, the profile correlation module 306 determines which RF emitter is described by which geolocation data.

In the illustrated example, the range-rate profile module 304 receives the RF sensor data 118 and processes it to generate a spectrogram of the emitter's signal frequency versus time. From the spectrogram, the range-rate profile module 304 acquires a signal of a particular RF emitter and selects an associated starting frequency band. Using the starting frequency band, the range-rate profile module then filters the signal and uses a phase lock loop to track the signal in order to create a phase versus time profile. From the phase versus time profile, the range-rate profile module 304 calculates a frequency shift versus time profile. The range-rate profile module 304 then multiplies this profile by the emitter's RF wavelength to compute a range-rate versus time profile for the emitter, which is analogous to a velocity versus time plot of the emitter relative to the RF sensor 116. While the foregoing describes one process for generating a range-rate profile from RF sensor data 118, it is to be understood that the range-rate profile module 304 may be configured to implement any suitable technique for generating such profiles.

The range-rate profile module 304 can vary the procedure for calculating range-rate profiles of objects observed by the geolocation sensor 104 based on whether or not the geolocation sensor 104 and the RF sensor 116 are collocated, i.e., mounted on a same sensor platform. In the exemplary system 100 shown in FIG. 1, the RF sensor 116 and the geolocation sensor 104 are not mounted to the same sensor platform 102, or in other words they are not collocated. In an example, if the geolocation sensor is mounted on an aircraft, the RF sensor 116 can, for example, be mounted on a second aircraft in motion relative to the first aircraft, so long as the RF sensor 116 and the geolocation sensor 104 are gathering data from the same scene.

Figure 4:
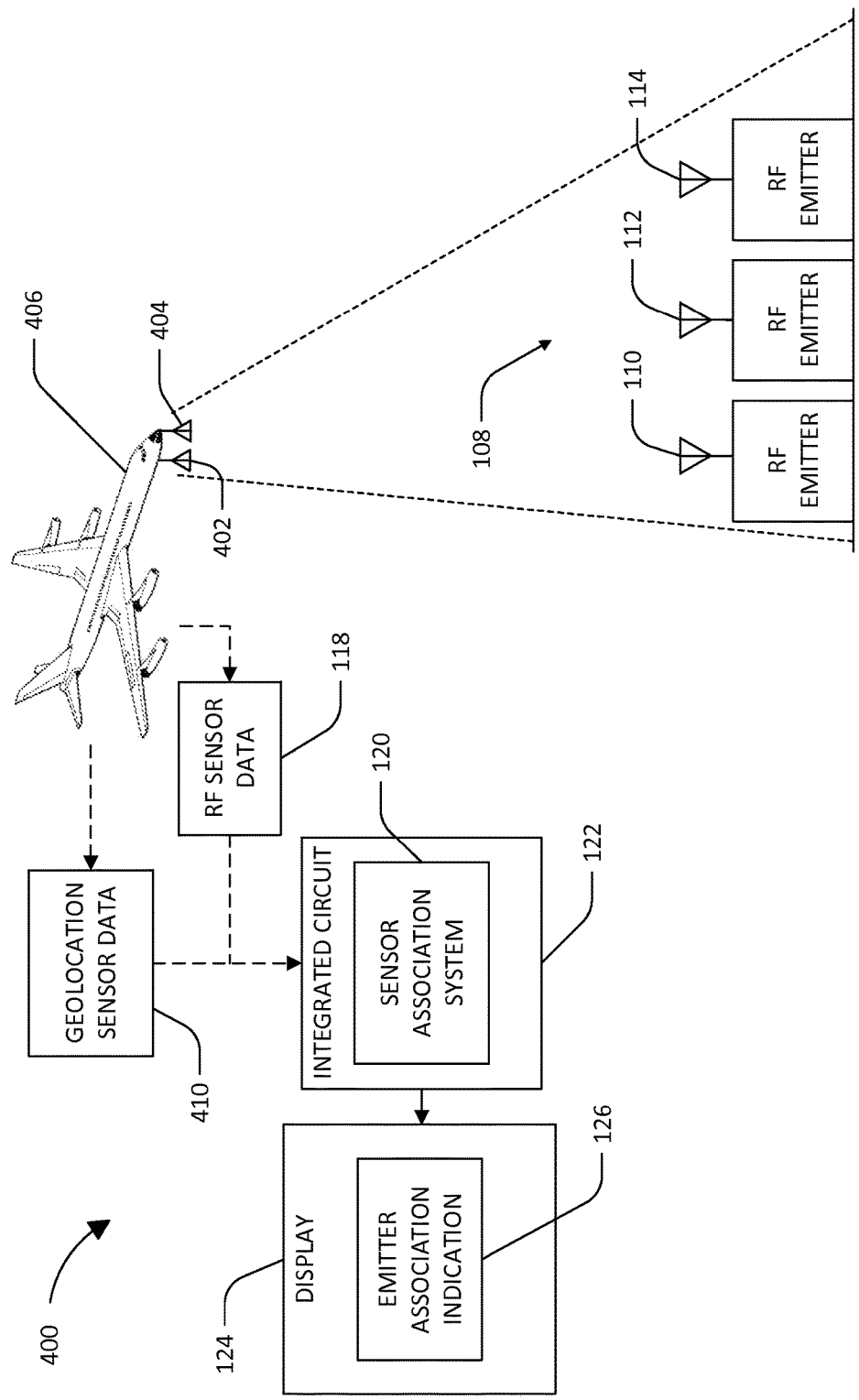
FIG. 4 is a functional block diagram of an exemplary system in which a geolocation sensor and an RF sensor are collocated on the same platform.

Referring now to FIG. 4, an exemplary system 400 is shown in which a geolocation sensor 402 and an RF sensor 404 are collocated on a same sensor platform 406. In the system 400, RF sensor data 118 comprising Doppler signatures of the RF emitters 110-114 is collected from the scene 108 by the RF sensor 404 as described with respect to the RF sensor 116 of FIG. 1 above. The geolocation sensor 402 collects geolocation data of the objects (e.g., the RF emitters 110-114) as described with respect to the geolocation sensor 104 of FIG. 1 above. In the exemplary system 400, in an example where the geolocation sensor 402 is a radar or other active emissions sensor, geolocation sensor data 410 can further comprise both geolocation data and a Doppler signature for each of the objects (e.g., RF emitters 110-114) observed in the scene 108. As described below with respect to FIG. 3, this permits the sensor association system 120 to calculate range-rate profiles based on the Doppler signatures collected by the geolocation sensor 402.

Referring again to FIG. 3, when the sensor association system 120 receives data from a collocated geolocation sensor 402 and RF sensor 404, the range-rate profile module 304, in an exemplary embodiment where the geolocation sensor 402 is an active emissions sensor, can calculate a range-rate profile of an object relative to the RF sensor directly from a Doppler signature of the object collected from the geolocation sensor 402. In an example, the geolocation sensor 402 can be a GMTI radar and can generate a series of successive range-Doppler maps of the scene 108. In the example, range-rate profile module 304 identifies the object in each map and constructs a range-rate profile of the object based on the series of identified Doppler map positions.

In the more general case, where the geolocation sensor 104 and the RF sensor 116 are not collocated, the range-rate profile module 304 calculates an effective range-rate profile of an object based upon the geolocation data collected by the geolocation sensor 104. The geolocation sensor 104 provides a series of observed locations for each detected object in the scene 108 for the duration of time over which the sensor 104 observes the scene 108. The range-rate profile module 304 then calculates a distance between the detected location of the object and the location of the RF sensor 116, yielding a sequence of distance measurements between the object and the RF sensor 116 over the window of observation. In one example, the location of the RF sensor can be fixed and known a priori. In another example, the location of the RF sensor can change over time, but the location is observed by the geolocation sensor or is determined through other means. The range-rate profile module 304 then subtracts adjacent elements in the sequence of distance measurements to yield an effective range-rate profile of the object relative to the RF sensor 116. This approach is applicable to the general case where the geolocation sensor 104 and the RF sensor 116 may or may not be collocated, and to the case where the geolocation sensor 104 is a sensor for which a Doppler signature is not readily collected (e.g., a passive optical sensor).

The profile correlation module 306 compares the range-rate profiles of the RF emitters 110-114 that were computed by the range-rate profile module 304 from the RF sensor data 118 with the range-rate profiles of the objects located in the scene 108 by the geolocation sensor 104. The profile correlation module 306 is configured to determine a measure of similarity between a range-rate profile of an RF emitter and a range-rate profile of an object as detected by the geolocation sensor 104. In an example where there are three RF emitters 110-114 in a scene 108, the profile correlation module 306 can associate the identity of a first RF emitter 110 with the geolocation data 106 of a first object in the scene 108 generated by the geolocation sensor 104 to determine that the first RF emitter and the first object in the scene 108 are in fact the same object, and so on for the second and third RF emitters 112-114. Where a range-rate profile computed from the RF sensor data 118 matches closely with an effective range-rate profile computed from geolocation data, the profile correlation module 306 determines that the RF emitter described by the RF sensor data 118 and the object described by the geolocation data 106 are the same object, because their respective motion relative to the RF sensor 116 as represented by the range-rate profiles is similar.

The profile correlation module 306 can implement any method suitable for comparing the similarity of two range-rate profiles. In an example, the profile correlation module 306 can compute a mean squared error between a pair of range-rate profiles and evaluate the computed error against a pre-determined false alarm threshold to determine whether the two profiles represent the same object. The false alarm threshold is determined based on expected error values of the data in light of the limitations of the RF sensor and geolocation sensor used. In another example, the profile correlation module 306 can generate an association table comprising a mean squared error value between the range-rate profile of each of the RF emitters 110-114 and the range-rate profile of each object observed by the geolocation sensor 104, and evaluate each of the resultant errors against one another and against the false alarm threshold to identify each of the RF emitters 110-114 among the objects. Once the profile correlation module 306 has determined that first position data from the geolocation sensor 104 refers to a position of the first RF emitter, an emitter association indication 126 can be presented on a display 124 that identifies that the first position data describes the position of the first RF emitter. In an example where the first RF emitter is attached to a vehicle, the emitter association indication can be a vehicle track representing a path observed in the geolocation data 106 displayed in a particular color based on its association with the first RF emitter.

Figure 5:
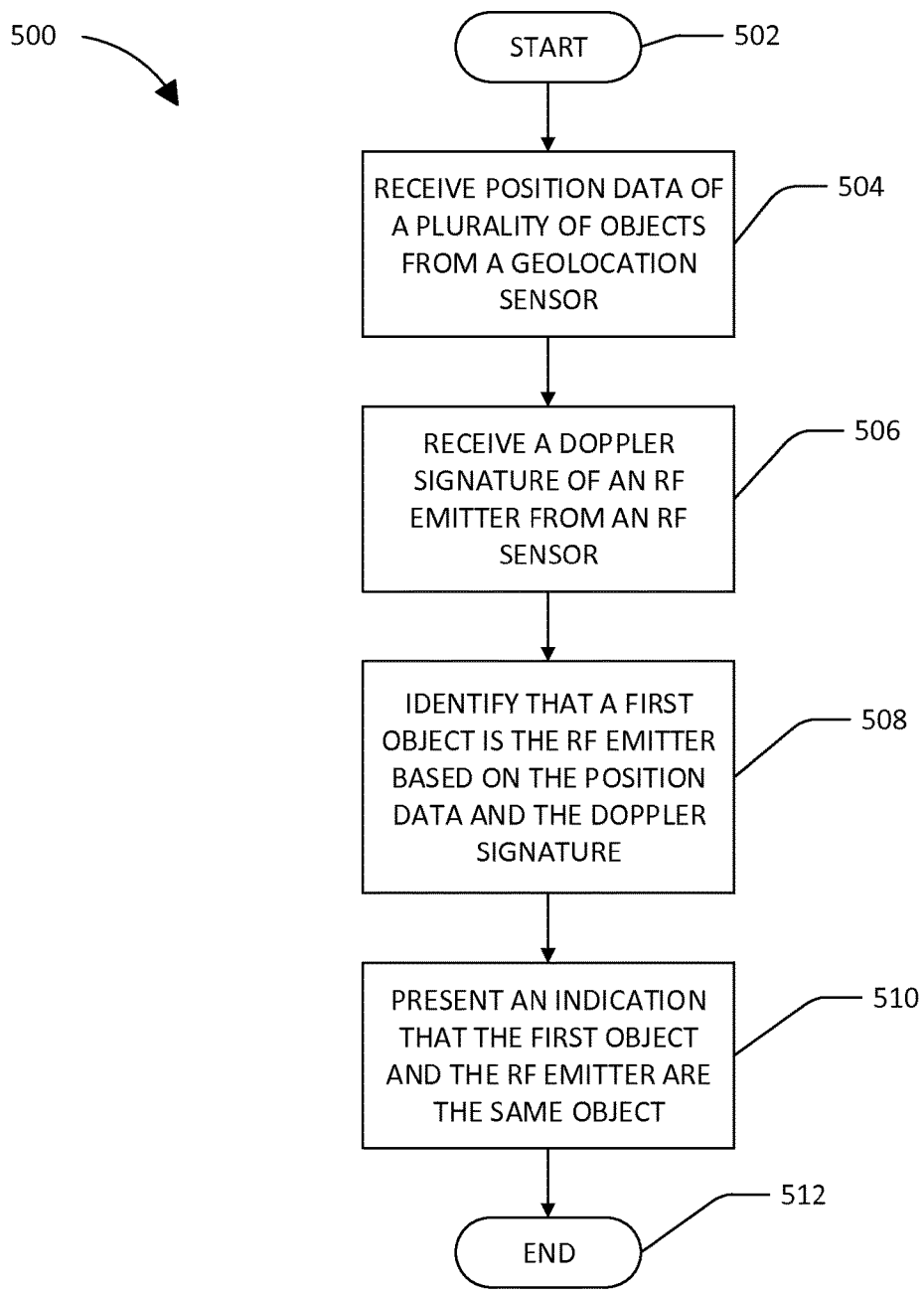
FIG. 5 is a flow diagram that illustrates an exemplary methodology for collecting RF sensor and geolocation sensor data associating the identity of an RF emitter with geolocation information from the geolocation sensor.
Figure 6:
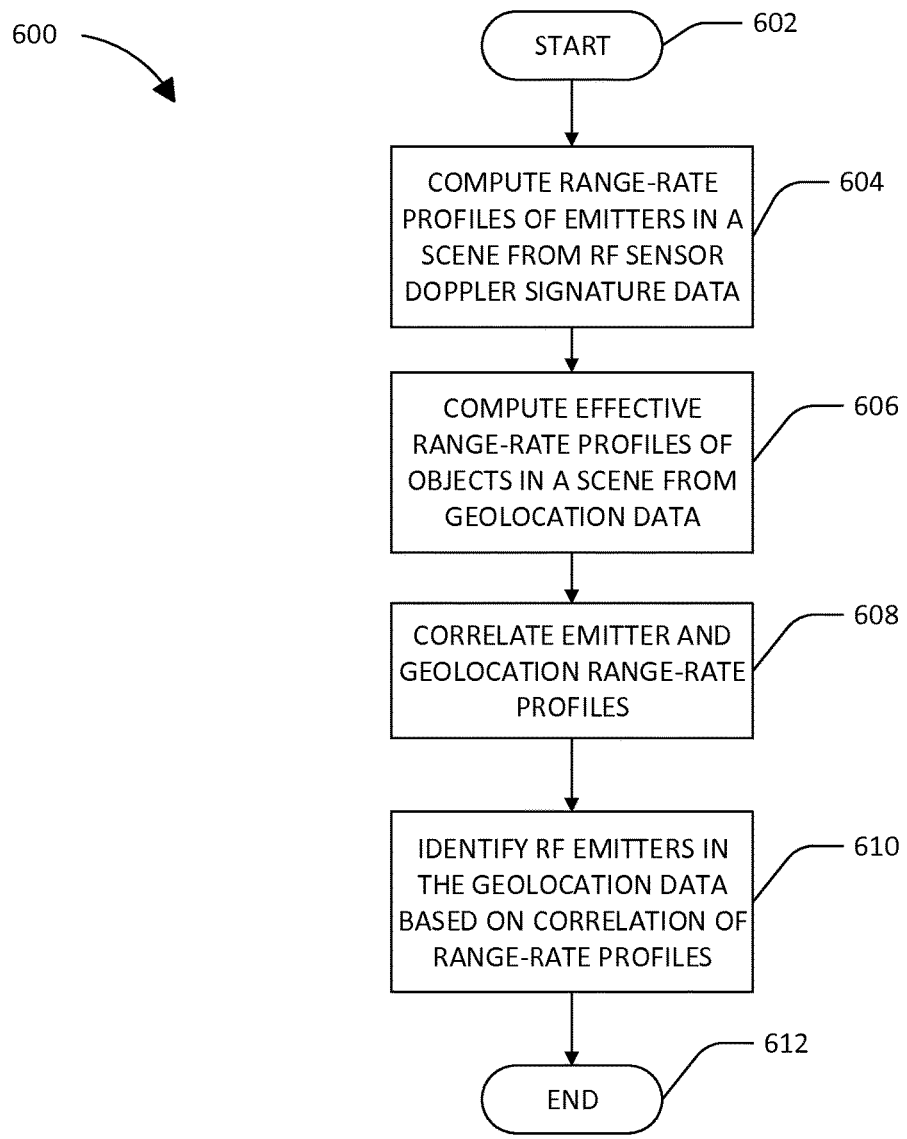
FIG. 6 is a flow diagram that illustrates an exemplary methodology for associating RF emitter identity information with geolocation data when the RF sensor and the geolocation sensor are collocated.
Figure 7:
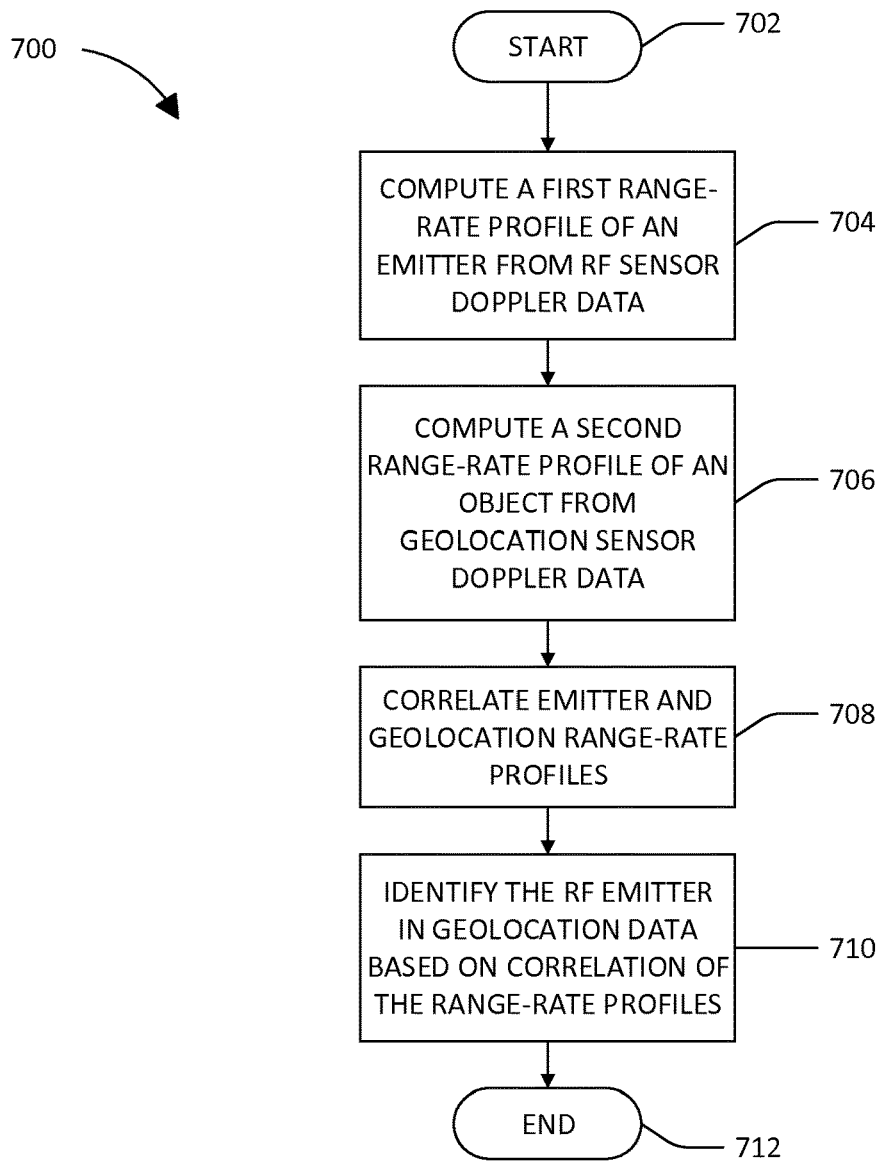
FIG. 7 is a flow diagram that illustrates an exemplary methodology for associating sensor data in the case where the RF sensor and the geolocation sensor are collocated.

FIGS. 5-7 illustrate exemplary methodologies relating to associating RF emitter identity information with geolocation data. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, a methodology 500 that facilitates associating identity information from RF sensors with geolocation data from geolocation sensors is illustrated. The methodology 500 begins at 502, and at 504 position data of a plurality of objects in a scene is received from a geolocation sensor. The geolocation sensor can be any sensor capable of locating moving objects of interest in a scene (e.g., SAR, GMTI, FMV, etc.). The scene comprises one or more RF emitters and may additionally include any number of other objects that are tracked by the geolocation sensor. At 506, a Doppler signature of at least one of the one or more RF emitters in the scene is received from an RF sensor collecting data from the same scene. The RF sensor can be a sensor that measures only the RF frequency of an emitter, and can be a sensor using a single RF channel. At 508, an RF emitter is identified as being a first object in the plurality of objects in the scene based upon the Doppler signature of the RF emitter and first position data of the first object, according to methods described in greater detail with respect to FIGS. 6 and 7. At 510, an indication that the RF emitter is the first object is presented on a display and at 512 the methodology 500 ends.

Referring now to FIG. 6, a methodology 600 that facilitates identifying that first geolocation data refers to an RF emitter based upon geolocation data and Doppler signatures received from a geolocation sensor and RF sensor is shown. The methodology 600 begins at 602, and at 604 range-rate profiles of RF emitters in a scene relative to an RF sensor are computed from Doppler signatures collected by the RF sensor. At 606, effective range-rate profiles of objects in the scene relative to the RF sensor are computed from the geolocation data. In an example, the position of the RF sensor is known, and the effective range-rate profile of an object relative to the RF sensor is computed by first taking a sequence of distance measurements based on the observed geolocation data for the object and the known position of the RF sensor, and then subtracting adjacent elements in the sequence to generate a profile of differential range over time. At 608, the range-rate profiles of RF emitters computed from the Doppler signatures are correlated with the effective range-rate profiles of objects in the scene computed from the geolocation data to generate a measurement of similarity between each of the RF profiles and each of the geolocation profiles. In an example, the measure of similarity is a mean squared error value between two profiles, but it is to be understood that any technique for evaluating the similarity of two profiles may be used. At 610, the RF emitters are identified in the geolocation data based upon the correlation of the RF range-rate profiles and the geolocation range-rate profiles. In an example, first geolocation data describing the motion of a first RF emitter can be identified among geolocation data comprising movement tracks of a plurality of objects in a scene. Thus, in the example, the methodology 600 can be used to single out data describing an object of interest in the scene from a much larger dataset. At 612, the methodology 600 ends.

FIG. 7 illustrates a methodology 700 that facilitates identifying an RF emitter in a geolocation dataset when Doppler signatures and geolocation data are collected by a collocated RF sensor and active-emission geolocation sensor. The methodology 700 begins at 702, and at 704 a first range-rate profile of the RF emitter is computed based on a first Doppler signature collected by the RF sensor. At 706, a second range-rate profile of an object in the scene is computed based on a second Doppler signature collected by the active-emission geolocation sensor. At 708, the first range-rate profile and the second range-rate profile are correlated and a measure of similarity between the profiles determined. At 710, the geolocation data corresponding to the RF emitter is identified based upon the correlation and measure of similarity between the first and second range-rate profiles, and at 712 the methodology 700 ends.

Figure 8:
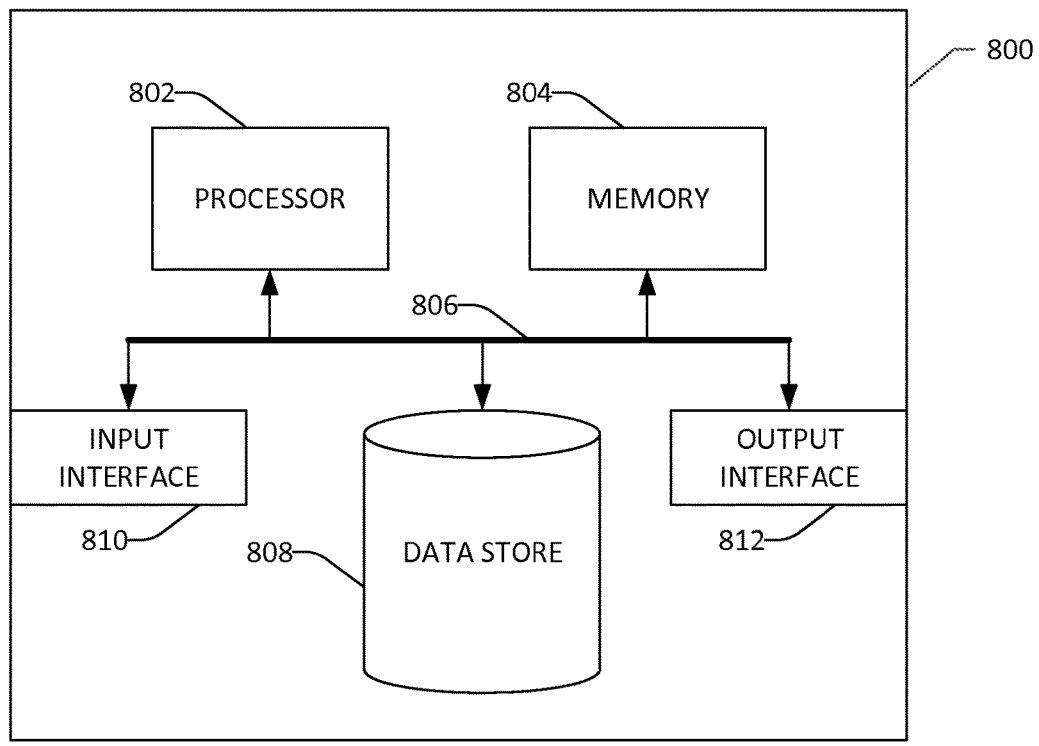
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be used in a system that computes and correlates range-rate profiles of RF emitters and other objects observed in a scene by geolocation and RF sensors in real time as geolocation data and RF sensor data is received. By way of another example, the computing device 800 can be used in a system that permits a user to submit queries over stored geolocation and RF sensor data to identify particular RF emitters in a geolocation dataset after the collection of data is completed. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store geolocation sensor data, RF sensor data, range-rate profiles, etc.

The computing device 800 additionally includes a data store 808 that is accessible by the processor 802 by way of the system bus 806. The data store 808 may include executable instructions, sensor data, range-rate profiles, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc., by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
    an integrated circuit configured to perform acts comprising:
        receiving location information for an object in a scene, the location information received from a geolocation sensor, the location information being indicative of a location of the object over a window of time;
        receiving a Doppler signature of a radio frequency (RF) emitter in the scene, the Doppler signature based upon data output by an RF sensor;
        calculating a first range-rate profile of the object in the scene relative to a location of the RF sensor based upon the location information;
        calculating a second range-rate profile of the RF emitter relative to the location of the RF sensor based upon the Doppler signature; and
        determining that the RF emitter is at the location of the object in the scene based upon comparing the first range-rate profile of the object and the second range-rate profile of the RF emitter; and
    a display that, responsive to the RF emitter being determined to be at the location of the object in the scene, presents an indication that the RF emitter is at the location of the object in the scene.

2. The system of claim 1, wherein calculating the first range-rate profile of the object in the scene comprises computing a plurality of range-rate values of the object relative to the location of the RF sensor, wherein computing a range-rate value over a period of time starting at a first time and ending at a second time comprises:
    identifying a first distance of the object relative to the location of the RF sensor at the first time based on the location information;

identifying a second distance of the object relative to the location of the RF sensor at the second time based on the location information;

computing a difference by subtracting the first distance of the object at the first time from the second distance of the object at the second time; and dividing the difference by a duration of the period of time.

3. The system of claim 1, wherein comparing the first range rate profile of the object and the second range rate profile of the RF emitter comprises:

computing a mean squared error between the first range rate profile and the second range rate profile; and comparing the mean squared error to a predetermined false-positive threshold.

4. The system of claim 1, wherein the geolocation sensor is one of:

a geolocation radar imaging system;

a full motion video imaging system; or a wide area motion imagery system.

5. The system of claim 1, wherein the RF emitter is attached to a moving object.

6. The system of claim 5, wherein determining that the RF emitter is at the location of the object in the scene comprises determining that the moving object traveled a route corresponding to the location information over the window of time.

7. A system comprising:

an integrated circuit configured to perform acts comprising:

receiving location information for an object in a scene, the location information received from a geolocation sensor, the location information comprising a location of the object over a window of time;

receiving a Doppler signature of an RF emitter in the scene, the Doppler signature based upon data output by an RF sensor;

computing a first range-rate profile of the object based upon the location information;

computing a second range-rate profile of the RF emitter based upon the Doppler signature; and determining that the RF emitter is at the location in the scene of the object based upon the first range-rate profile of the object and the second range-rate profile of the RF emitter; and a display that presents an indication that the RF emitter is at the location in the scene of the object.

8. The system of claim 7, further comprising the geolocation sensor, the geolocation sensor being a radar sensor.

9. The system of claim 8, wherein the location information comprises a second Doppler signature.

10. The system of claim 7, wherein determining that the RF emitter is at the location in the scene of the object further comprises:

comparing the first range-rate profile with the second range-rate profile; and determining that the RF emitter is at the location in the scene of the object based upon the comparing of the first range-rate profile with the second range-rate profile.

11. The system of claim 10, wherein comparing the first range-rate profile with the second range-rate profile comprises:

computing a mean-squared error between the first range rate profile and the second range rate profile; and comparing the mean squared error to a predetermined false-positive threshold.

12. A method comprising:

receiving position data of a plurality of objects in a scene from a geolocation sensor, the position data comprises a position of an object in the plurality of objects;

receiving a Doppler signature of an RF emitter in the scene from an RF sensor;

computing a first range-rate profile of the RF emitter relative to a position of the RF sensor over a window of time based upon the Doppler signature;

computing a second range-rate profile of the object relative to the position of the RF sensor over the window of time based upon the position of the object in the position data;

identifying that the RF emitter and the object are a same object based upon the comparing the first range-rate profile and the second range-rate profile; and presenting an indication that the object and the RF emitter are the same object.

13. The method of claim 12, wherein the plurality of objects in the scene comprises a plurality of RF emitters, and further wherein the position data comprises a position of a second object in the plurality of objects, the method further comprising:

receiving a second Doppler signature of a second RF emitter in the scene from the RF sensor; and identifying that the second RF emitter and the second object in the plurality of objects are a second same object based upon the position of the second object in the position data and the second Doppler signature.

14. The method of claim 13, wherein the plurality of RF emitters comprises a plurality of moving objects.

15. The method of claim 12, wherein comparing the first range-rate profile and the second range-rate profile comprises:

computing a mean squared error between the first range-rate profile and the second range-rate profile; and comparing the mean squared error to a predetermined false-positive error value.

16. The method of claim 12, wherein computing the second range-rate profile of the object comprises computing a plurality of range-rate values of the object relative to the position of the RF sensor.

17. The method of claim 16, wherein computing the plurality of range-rate values of the object comprises:

computing a range-rate value over a second window of time starting at a first time and ending at a second time, wherein computing the range-rate value comprises:

identifying a first distance of the object relative to the position of the RF sensor at the first time based on the position of the object in the position data;

identifying a second distance of the object relative to the position of the RF sensor at the second time based on the position data;

computing a difference by subtracting the first distance from the second distance; and dividing the difference by a duration of the second window of time.

\* \* \* \* \*